(12) United States Patent
Ribes et al.

(10) Patent No.: US 6,279,346 B1
(45) Date of Patent: Aug. 28, 2001

(54) METHOD FOR REDUCING HOT STICKING IN MOLDING PROCESSES

(75) Inventors: Michel Ribes, Clapiers; Philippe Papet, Prades le Lez; Corinne Thomas, Paris; Jerome Anquetil, Saint-Leonard, all of (FR)

(73) Assignee: dmc² Degussa Metals Catalysts Cerdec AG, Frankfurt (DE)

( * ) Notice: Subject to any disclaimer, the term of this patent is extended or adjusted under 35 U.S.C. 154(b) by 0 days.

(21) Appl. No.: 09/368,079

(22) Filed: Aug. 3, 1999

(30) Foreign Application Priority Data

Aug. 4, 1998 (FR) .................................................. 98 10004

(51) Int. Cl.⁷ ............................ C03B 35/00; C03B 40/02
(52) U.S. Cl. ................................ 65/25.4; 65/24; 65/25.2; 65/62; 65/169; 65/170; 65/181; 65/375; 65/102; 65/111; 264/334; 264/430; 264/484
(58) Field of Search .................................... 65/24, 62, 169, 65/170, 181, 357, 375, 25.2, 25.4, 102, 111; 264/334, 430, 484, DIG. 45; 425/174.6, 174.8 R, 174.8 E, 176, 438, 436 RM

(56) References Cited

U.S. PATENT DOCUMENTS

| | | |
|---|---|---|
| 1,035,390 | * 8/1912 | Sievert . |
| 3,143,413 | * 8/1964 | Krapf . |
| 3,182,103 | * 5/1965 | Blaylock, Jr. et al. . |
| 3,236,620 | 2/1966 | Wiley ...................................... 65/262 |
| 4,684,388 | 8/1987 | Boaz ........................................ 65/24 |
| 4,828,596 | 5/1989 | Reinherz ................................... 65/24 |
| 5,153,150 | 10/1992 | Ruderer et al. ......................... 401/17 |
| 5,573,715 | * 11/1996 | Adams et al. . |
| 5,578,101 | 11/1996 | Blonder et al. ........................ 65/17.2 |
| 5,894,002 | * 4/1999 | Boneberger et al. . |

FOREIGN PATENT DOCUMENTS

| | | |
|---|---|---|
| 0 370 683 | 5/1990 | (EP) . |
| 0 477 785 | 4/1992 | (EP) . |
| 2 641 549 | 7/1990 | (FR) . |
| 58-007367 | * 1/1983 | (JP) . |

OTHER PUBLICATIONS

The American Heritage Dictionary, Second College Edition; pg 1191, definition of "stave", 1982.*
Patent Abstracts of Japan, vol. 7, No. 81, Apr. 5, 1983 & JP 58 007367 A, Jan. 17, 1983.

* cited by examiner

Primary Examiner—Michael P. Colaianni
(74) Attorney, Agent, or Firm—Wenderoth, Lind & Ponack, L.L.P.

(57) ABSTRACT

The method of the present invention overcomes the hot-sticking problems between an inorganic non-metallic material (=insulator) to be molded and a forming die by maintaining an assembly comprising a forming die and the insulator in a polarized state during molding. Processes using said method lead to an improved surface quality of the molded insulator. A device for reducing said hot-sticking comprises a die (2) which acts as conductor, an electrode (3) which may act as support for the insulator (1) to be molded, means (5) for polarizing the assembly of said conductor, insulator and electrode which means (5) are connected by live electric wires (4) with said die and electrode.

16 Claims, 7 Drawing Sheets

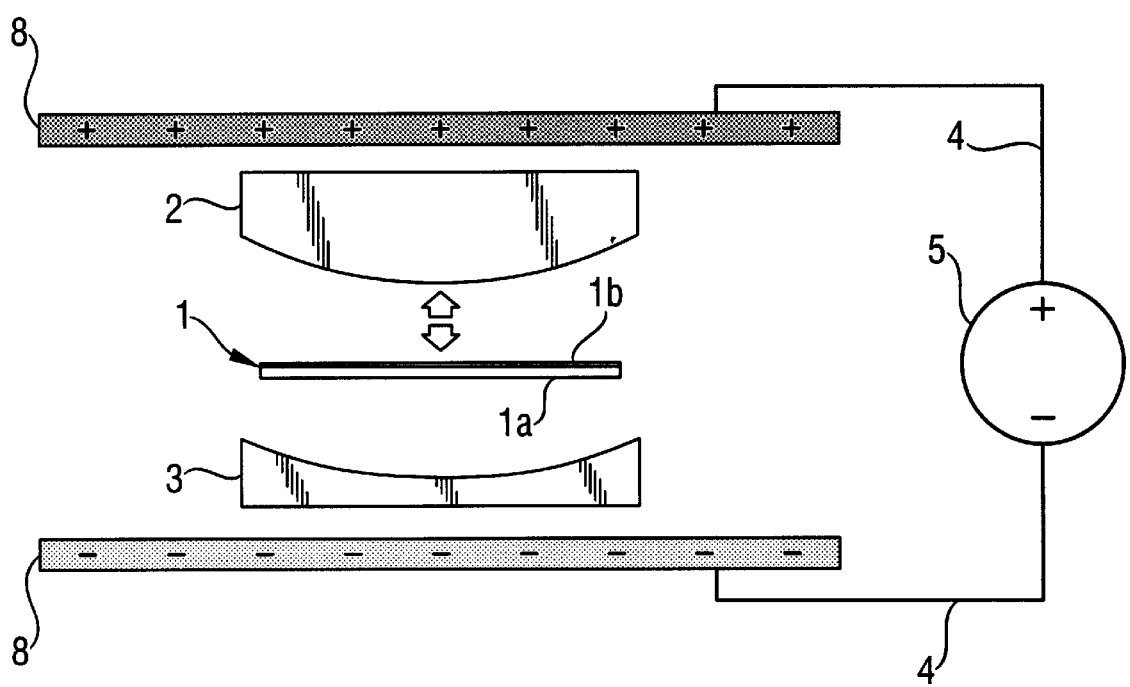

Fig. 6a
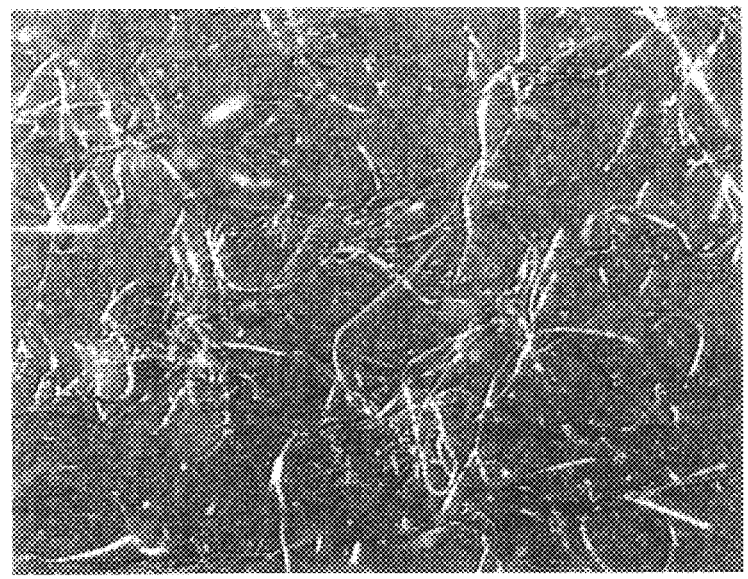
Fig. 6
Fig. 6b

METHOD FOR REDUCING HOT STICKING IN MOLDING PROCESSES

BACKGROUND OF THE INVENTION

1. Field of the Invention

The present invention concerns a method for reducing and more preferably for eliminating hot sticking between a die, particularly an electrically conducting die, and an inorganic non-metallic material (=an insulator), particularly an insulator of which at least a part is in vitreous state, being in contact with each other at a temperature where the insulator is moldable. The invention is furthermore directed to a process for producing a molded insulator with improved surface quality by using said method and to a device to perform said method.

2. Description of Related Art

Numerous undesirable hot sticking phenomena occurring in complex industrial processes can be attributed to a general problem of hot sticking between a forming die which in general is made from a metal or another electrically conducting material and an inorganic non-metallic material (=insulator), in particular an inorganic insulator like glass, enamel and ceramic, of which at least one of the phases which constitute it is viscous at the temperature in question.

During the hot molding of inorganic insulating materials like glass or enamel or combinations therefrom at a temperature for which said materials have a viscosity of between 1 and 10,000 kPa·s (=$10^4$ and $10^8$ poises) sticking phenomena are encountered between said insulating materials and the forming die or the mold. The forming die may be entirely metal, or ceramic covered with a metallic coating, or metal or ceramic covered with a ceramic coating sufficiently electrically conductive at the molding temperature. The temperature range corresponding to said viscosities is variable according to the composition, from 500 to 1000° C. for certain industrial silica-alkali-lime glasses. These phenomena have appeared in the course of the development of new technologies. For example:

1. Sticking of a molten glass to the metal mold during the manufacture of flasks, bottles, beakers.
2. Sticking of an enamel (mixture of a glass in powder form which is called frit and of a crystallized coloring agent which is called pigment) to the metallic forming die during the forming of glazings of automobiles.

This list is not at all exhaustive.

Some solution have been found for enamels for glazings of automobiles:

Addition of zinc and tin oxides, or of copper sulphates, which act as "anti-stick" components, that is to say they are components which contribute the property of non-sticking—see U.S. Pat. Nos. 4,684,388 (Ford Motor Company) and 4,828,596 (Ciba-Geigy Corporation).

Development of glass frits which recrystallize on stoving—see EP 0 370 683 A1 (Johnson Matthey Public Limited Company) and U.S. Pat. No. 5,153,150 (Ferro Corporation).

This type of solution is only partial however. The success of said compositions depends to a large extent on the forming conditions, and more particularly on the stoving cycle of the enamels.

It is an object of the present invention to limit the sticking problems without acting on the compositions. It is a further object to provide a process for any kind of molding of at least partly vitreous inorganic materials which leads to a better surface quality of the molded article by eliminating or at least reducing said hot sticking problems. Still another object is directed to a device comprising the usual equipment which permits said molding and means by which said sticking phenomena can be reduced or essentially be avoided.

SUMMARY OF THE INVENTION

The present invention overcomes the hot sticking problems by contacting the inorganic non-metallic material to be moulded, hereinafter denoted as an insulator, with a forming die within an electric field at elevated temperatures required for the moulding process.

The inventors have found a method for reducing hot sticking between a die and an inorganic non-metallic material (=insulator) being in contact with each other at a temperature where said insulator is moldable, characterized in that an assembly comprising said die and said insulator is maintained in a polarized state during said contact, whereby the face of said die contacting said material is positively charged and that face of said material contacting said die is negatively charged.

Preferably the insulator consists essentially of inorganic materials, like glass, enamel and ceramic, of which at least one part contacting the die is in vitreous form. As already stated the die may consist of metal, metal alloys or combinations of ceramic/metal, ceramic/semi-conductor or other combinations, with the proviso that the cover layer of said conductor is made from a material which is sufficiently electrically conductive at the operating temperature. This invention therefore preferably applies to inorganic insulator/ forming die systems, at temperatures required for the molding of glass.

The inorganic non-metallic material to be molded is an insulator at room temperature but becomes electrically conductive during the thermal treatment at the firing and/or molding temperature. This is the ionic conductivity of the vitreous part of for example an enamel layer which makes possible charge transfers from one side to the other of said layer at said firing/molding temperature.

Said polarization can be achieved and maintained by using any known method for building-up an electrical field, e.g. by applying a voltage or a current to said assembly, by the aid of a plate-like capacitor whose armaments (=plates) are on either side of said assembly or by inducing a current across the insulator/die-interface.

Moreover, if it is decided to create said polarization by applying a voltage, the voltage required to reduce the sticking must be suited to the system, which is influenced by e.g. the nature and thickness of the insulating material, the nature of the forming die or mould, the geometry of the system as well as the moulding conditions, like the pressure and temperature.

By using the inventive method in molding processes an improved surface quality of the molded article is obtained because of the absence of hot sticking defects.

BRIEF DESCRIPTION OF THE FIGURES

FIG. 5: Example of a system for forming of glazings of automobiles using the principle of a capacitor encompassing the assembly of the forming die, the glazing and the support of the glazing.

FIG. 6a: Photograph of the surface of an enamelled glass sheet after non-inventive contact of the enamel with a forming die coated with metal fabric of steel (316L steel, one of the most commonly used steels for that purpose) under traditional forming conditions.

FIG. 6b: Photograph of the surface of the same enamelled glass sheet after inventive contact of the enamel with the same forming die and under the same conditions of temperature and compressive force as for the test of FIG. 6a. A d.c. voltage has been applied to the system, according to the diagram of FIG. 1.

DETAILED DESCRIPTION OF THE INVENTION

Figure 1:
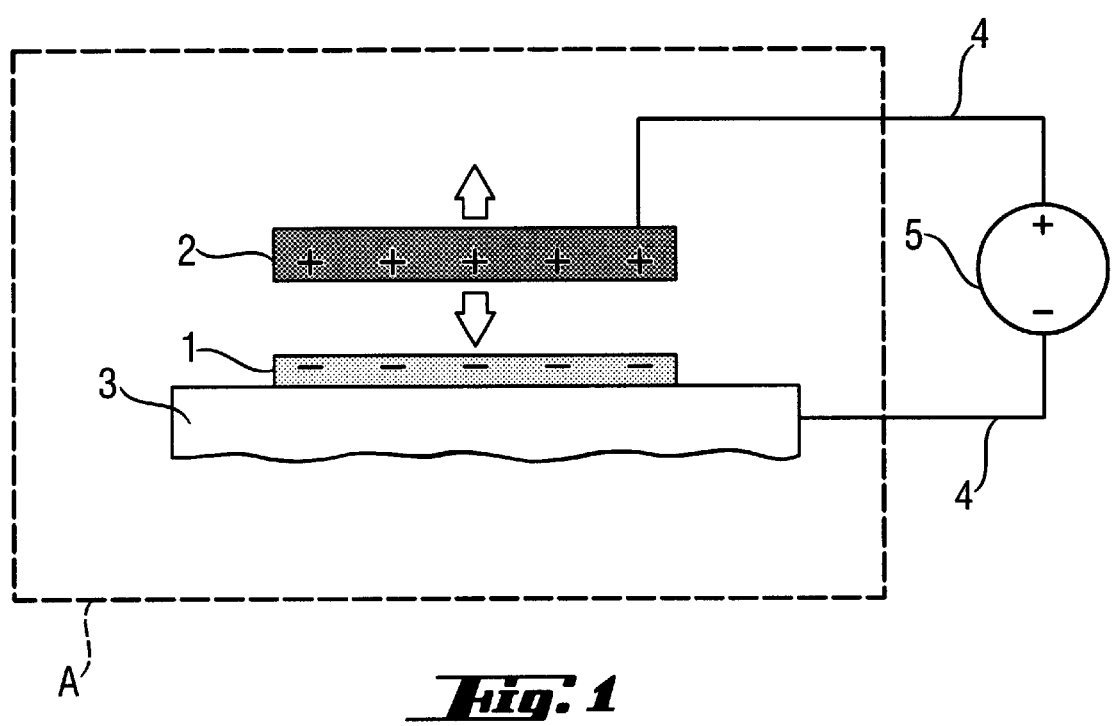
FIG. 1: Schematic description of the principle of the invention for reducing to a large extent the hot sticking phenomena at the interface between an inorganic insulator and a die.

The principle of the invention is explained with reference to FIG. 1 which shows one preferred embodiment. In a general way, the device for reducing hot sticking in molding processes for an inorganic insulator (1) comprises two main elements: A die (2) which is electrically conductive at least at molding temperature and acts as a conductor and an electrode (3) which can also serve as support for the insulator. The die (=conductor) (2) and/or the electrode (3) are movable to each other in order to bring the insulator to be molded into contact with said die. A current or voltage source (5) is connected to the die and to the electrode by live electric wires (4) which are non-oxidizing at the elevated temperatures concerned, e.g. platinum, gold or another non-oxidizing metal or metal alloy. After switching on said current or voltage source for polarizing the assembly of said die, insulator and electrode, the conductor becomes positively charged on its face intended to come into contact with the insulator. Conversely, the face of the insulator intended to come into contact with the conductor becomes negatively charged.

The current or voltage source can be a continuous source, e.g. a dry battery or an accumulator, or a variable source, e.g. an alternating current or a transformed or rectified current. If the source is continuous, the positive and negative poles of the source are preferably connected to the conductor and to the electrode in contact with the insulator, respectively. If the source is variable, the dominant polarity must be the same as in the case of a continuous source, and in addition the duration of the moments in which the polarity is inverted or zero must be sufficiently short not to invert the polarity at the terminals of the insulator/conductor system or not to depolarize the system.

It is also possible to create a current across the insulator/conductor interface by induction. It may then be necessary to connect the live electric wires to one another in order to permit polarisation of the system. In this case, the current source can no longer be represented as in FIG. 1. However, in order to simplify the representation of the system, it has been decided to retain this simplification, including for the creation of current by induction.

Still another embodiment for polarizing the assembly which comprises said conductor, said insulator and said electrode is based on the use of a plate-like capacitor whose armaments (=plates) are arranged on either side of said assembly. Some more details will be explained below with reference to FIG. 5.

In FIG. 1 the box marked with the capital letter A and the broken line which surrounds the assembly of the die (=conductor) (2), the insulator (1) and the electrode (3) shall indicate that there are means to provide the system with the necessary heat for the molding process.

It is to be stated that in this application the term "molding" comprises any process whereby an insulator comes into direct and mostly intensive contact with any kind of a conductive forming die, independently whether and in which extend the shape of the insulator is changed—most usually the shape is changed. So, the term "molding" includes also processes like pressing, bending and press-bending. Similarly, the term "forming die" includes such dies by which the form of the insulator is not or only slightly changed.

In a preferred manner of operating the device the assembly of the die (=conductor), insulator and electrode is brought into said polarized state and then the conductor is placed in contact with the insulator in the hot state—at a temperature T where molding can be performed—with a pressure enabling said molding, and is then removed from it while maintaining said polarization, since it is desired to avoid any sticking problem between the two materials.

Figure 7:
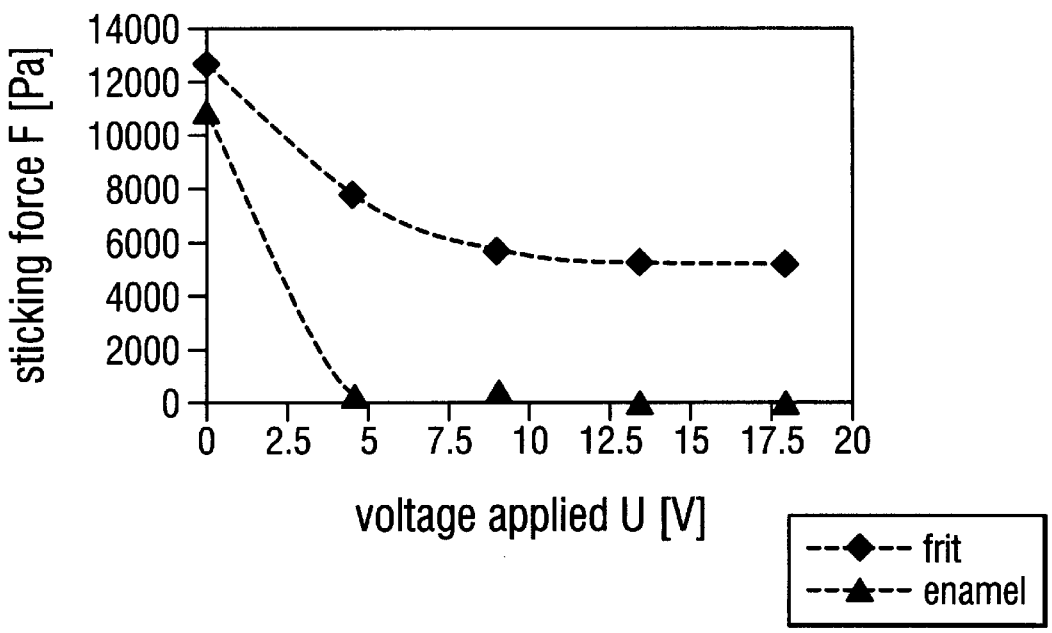
FIG. 7: Diagram showing the sticking force in dependence on the applied voltage for the frit and the enamel according to example 1.

If the system is polarized with the aid of a voltage, a voltage suited to said system must be selected:

As can be seen from FIG. 7, showing the situation for a frit and an enamel, the sticking force F falls down from more than $1 \cdot 10^4$ Pa to a threshold value F of approximately $5 \cdot 10^3$ Pa in the case of the frit and to approximately zero in the case of the enamel when the voltage is increased.

A voltage threshold U exists above which the value of the sticking force becomes constant. It is possible that the sticking force diminishes further, but for much higher values of the voltage, values which lie outside the scope of this figure.

The threshold value U of the voltage depends on the system, and more particularly on its electrical resistance which is a function of the thickness of the insulating material which make up the system and the resistivity of said material. It also depends on the quality of the contacts between the various elements of the circuit, that is to say on the electrical contact resistance of the circuit. The same applies to the minimum value F of the sticking force. Said value F also depends on the sticking force when the system is not polarized, that means in the absence of an electrical field.

Some applications of this invention will be described in the following paragraphs.

1. Automotive Glazings

Automotive glazings, preferably glazings of automobiles, comprise patterns on a glass sheet, which patterns are most often black and consist of an enamel. The glass sheets are enamelled before the forming stage. They are then heated to allow the glass to deform. Said stage which is usually performed by means of appropriate forming dies also permits the stoving of the enamel. Thereby the glass particles contained in the enamel sinter together resulting in a smooth and mechanically resistant layer firmly attached to the supporting glass sheet. The forming is therefore carried out in the hot state, at a temperature T at which the enamel is only slightly viscous. Said temperature T exceeds the so-called glass-temperature Tg by in general 100 to 200° C., mostly by approximately 150° C.

Without the inventive polarization said enamel sticks to the coating of the forming die for the glazings. The die coating is generally a metal "fabric", in reality, it is a knitted fabric, or more rarely a ceramic paper (type of blotting paper composed of ceramic fibers). In any case said ceramic paper must be sufficiently electrically conductive at the operation-temperature in order to become positively charged in the inventive process.

The enamel is a mixture of powdered glass which is called a frit (an enamel may comprise one or more frits) and one or more pigments which are powders of generally crystalline, colouring and/or opacifying materials, contributing the coloration and the opacity to the enamel layer. In addition the solids of the enamel may comprise anti-stick additives and processing aids. Said powder mixture is then mixed with an organic medium which disappears in the course of the stoving of the enamel and enabling the enamel in the form of a viscous paste to be applied to, most usually by screen printing. After stoving, a partly vitreous deposit is obtained. Its thickness after stoving lies usually between 15 and 25 microns.

The sticking of the enamel to the forming die coatings is generally caused by the vitreous phase of the enamel (the frits). The pigments and anti-stick additives are inert with respect to said die coatings and contribute in addition, in a general way, to some diminution in the sticking, through a mechanical effect.

Figure 2:
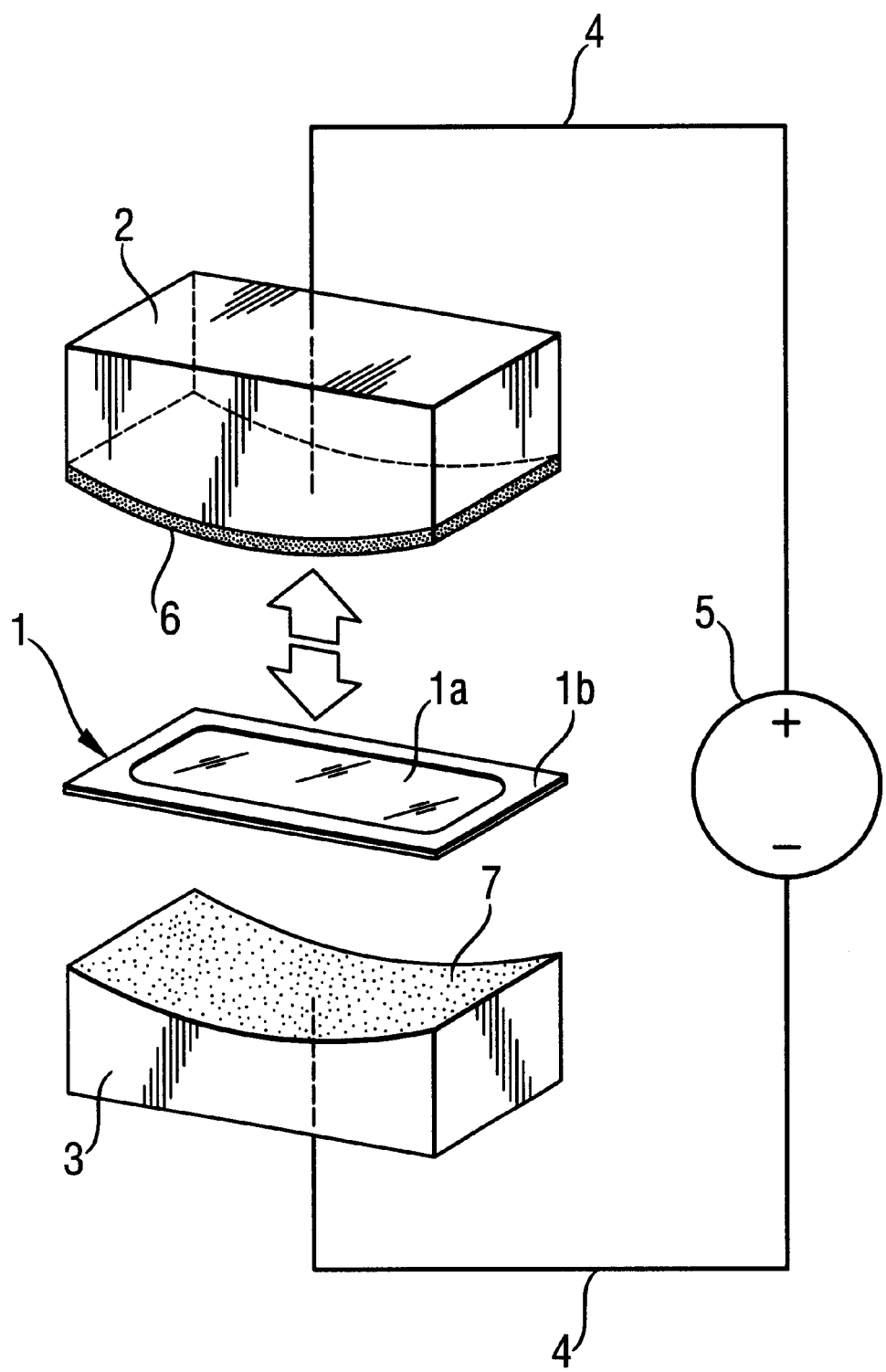
FIG. 2: Schematic description of forming of the glazings of automobiles by using a forming die covered with a metal or ceramic coating.

This invention eliminates any hot sticking problem between the enamel and the forming die coating, thus providing glazings with an improved surface quality by bringing about a polarization in the die/enamelled glazing system. See FIG. 2. Said polarization is effected by connecting the electrically conductive layer (6) of the die (2) and the electrically conductive layer (7) of the support (3) of the glazing respectively, with a current or voltage source (5) by means of live electric wires (4) and allowing a current to pass thereto or by applying a voltage. In order that this invention is applicable, a system is present which can be likened to a capacitor, that is to say that there are two components conducting the electric current ((6) and (7)) which act as the armaments of the capacitor, and the glazing (1) composed of window glass (1a) and enamel (1b) acting as the dielectric or part of the dielectric. The enamel can however be a fairly good ion conductor at high temperature. It is necessary therefore, that at least a part of the die/die coating assembly is a good conductor of electricity—in this case the die coating (6). Similarly, it is necessary that at least that part of the support of the glazing which acts as electrode is a good conductor of electricity at operation—temperature—in this case the conductive layer (7) of said support (3).

Figure 4A:
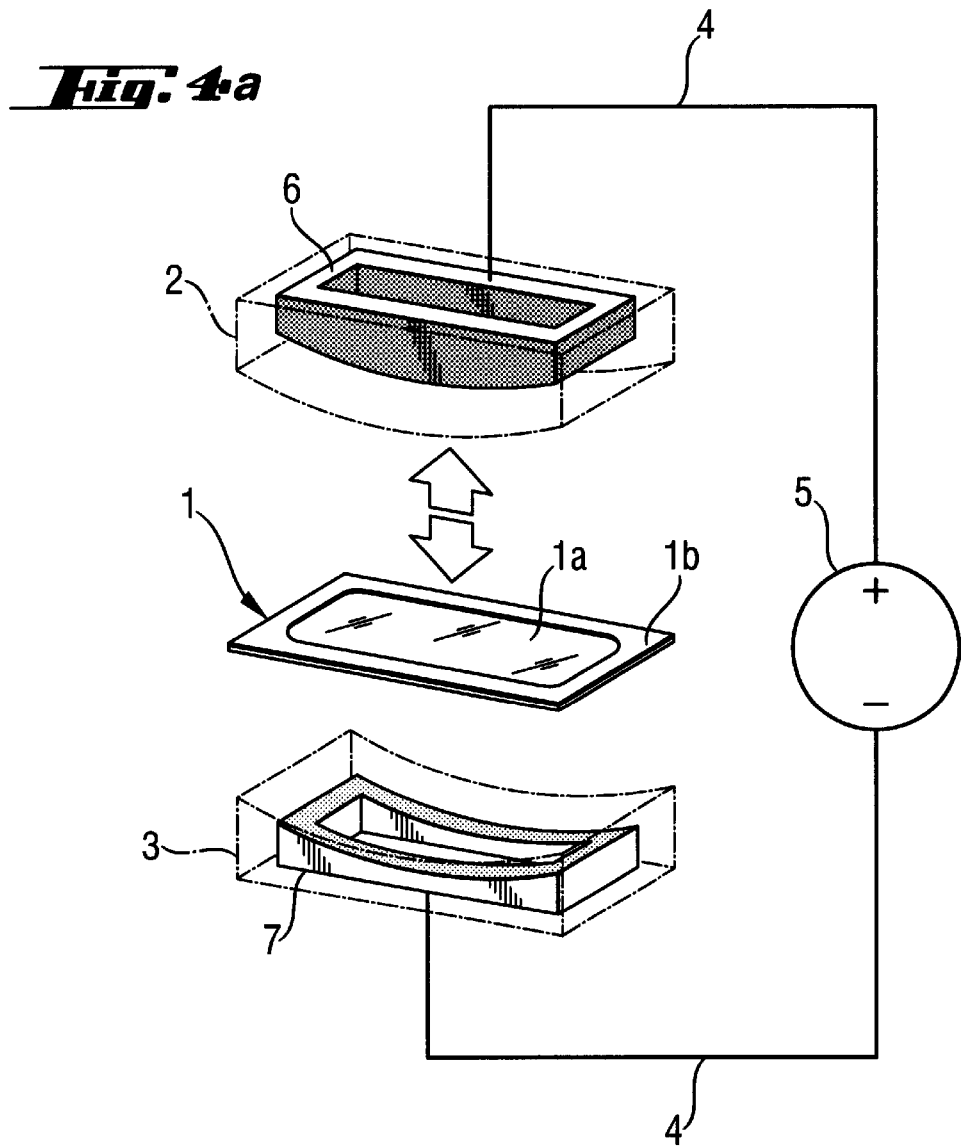
FIG. 4a: Schematic description of the connections for reducing the sticking of the enamel deposited on the glazings of automobiles to the coating of the forming die of said glazings.
Figure 4B:
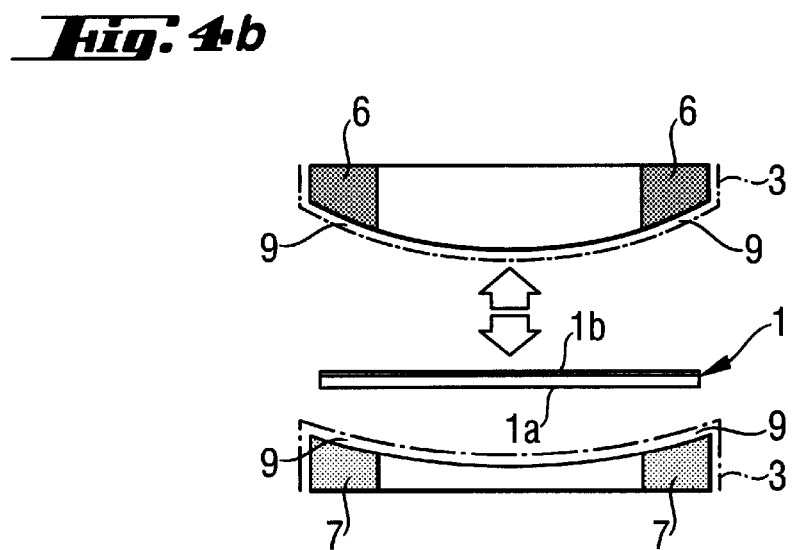
FIG. 4b: cross-section thereto.

According to the embodiment of FIGS. 4a and 4b the parts which are good conductors of electricity, (6) and (7), must be disposed so that the parts of the glazing (1) covered with enamel (1b), and which therefore pose sticking problems during the forming operation, are well framed by them. The window glass parts (1a) not covered with enamel, which do not pose a sticking problem, are not subject to any particular condition: It is not necessary for them to be framed by the parts (6) and (7), but if they are surrounded by said parts (6) and (7), this does not have a detrimental effect on the process for the forming of the glazings. It is not necessary for the parts (6) and (7) to be exactly plane and parallel. In other words, it is not necessary for a plane capacitor to be created. The other materials constituting the forming die/die coating assembly, as well as the frame supporting the glazing, can be electric insulators at ambient temperature. However, the portions (9) insulating at ambient temperature situated between the two parts of the system—see FIG. 4b—, which can be likened to the armaments of a capacitor, must, at the elevated temperatures at which the glazings are formed, be sufficiently good electronic or ionic conductors.

The connections (4) in FIG. 4a are effected directly on the electrically live part (6) of the forming die/die coating assembly and on the electrically live part (7) of the support of the glazing, in order that the electric field is distributed over the whole zone covering the enamelled part of the glazing. For this, it may be necessary to establish several connections on each element, that is to say on the conductive parts (layer) of the die and the support, respectively. The current or voltage, source (5) can be composed of one or more accumulators connected in series, or of one or more dry batteries connected in series, or of a transformed or rectified alternating current, or any other source enabling the required polarization. The positive and negative poles are connected to the die and to the support, respectively. Thus, the forming die/die coating assembly acts as the anode and the frame supporting the glazing acts as the cathode. The present invention can therefore be described by the term "anti-stick anode".

The polarization can also be created by any other means besides the current or voltage source directly connected to the forming die and to the support of the glazing. For example, according to FIG. 5 it is possible to imagine a plate-like capacitor connected to a current or voltage source (5) by live electric wires (4) whereby the armaments (=plates) (8) of said capacitor would be on either side of the forming die (2) and the glazing support (3), without physical contact with them. In this case, it is not necessary for the die and the support to contain an electrically conductive part.

There can be several layers of insulators in the system, such as a sandwich. For example, the exterior of the die can be in ceramic and said die can be covered with a coating of ceramic fibres. Similarly, the frame supporting the glazing can be coated with ceramic. However, at the temperatures for the molding of the glass, said insulators must be sufficiently good electronic or ionic conductors, and it is essential to effectively adapt the voltage applied-to the system. For example, it may be necessary, in cases where the forming die is covered with a metal fabric of stainless steel, during a forming run of the glazings to increase in the course of time the voltage applied by reason of the ageing of the metal fabric, which adds progressively a less efficiently conducting zone of oxides (of iron, chromium and nickel) between the conductor and the glazing (zone forming part of zone (9) in FIG. 4). The quality of the contact between the insulator and the support of which a part acts as the electrode influences the antisticking effect. The better the contact, the better the antistick effect. In case of a bad contact or even a gap between the insulator and the electrode, a higher voltage is to be applied in order to achieve a good antistick effect.

2. Molded Glass

This invention can be used during the operation for producing molded glass. The molding of the glass is performed, in the majority of cases, in two stages, except for the manufacture of extremely widemouthed pieces such as salad bowls or dishes. Two processes are possible. Only the first stage, the pre-molding, is different from one method to the other: the blanking of the molded pieces is performed by pressing or by blowing. For relatively widemouthed pieces, only the first stage, by pressing, is necessary. The surface quality of the preforms is not very important, provided that the surface is not very marked. The use of this invention is therefore not always necessary during the first stage. Conversely, in the case of a single pressing stage the pressing operation must leave the, surface of the pieces perfect, and therefore the present invention can be useful as early as the first molding stage. The second stage is the definitive forming of the glass pieces. This stage is very important for the surface quality of the molded articles. It is therefore necessary to eliminate any sticking phenomena between the glass and the mold.

Figure 3:
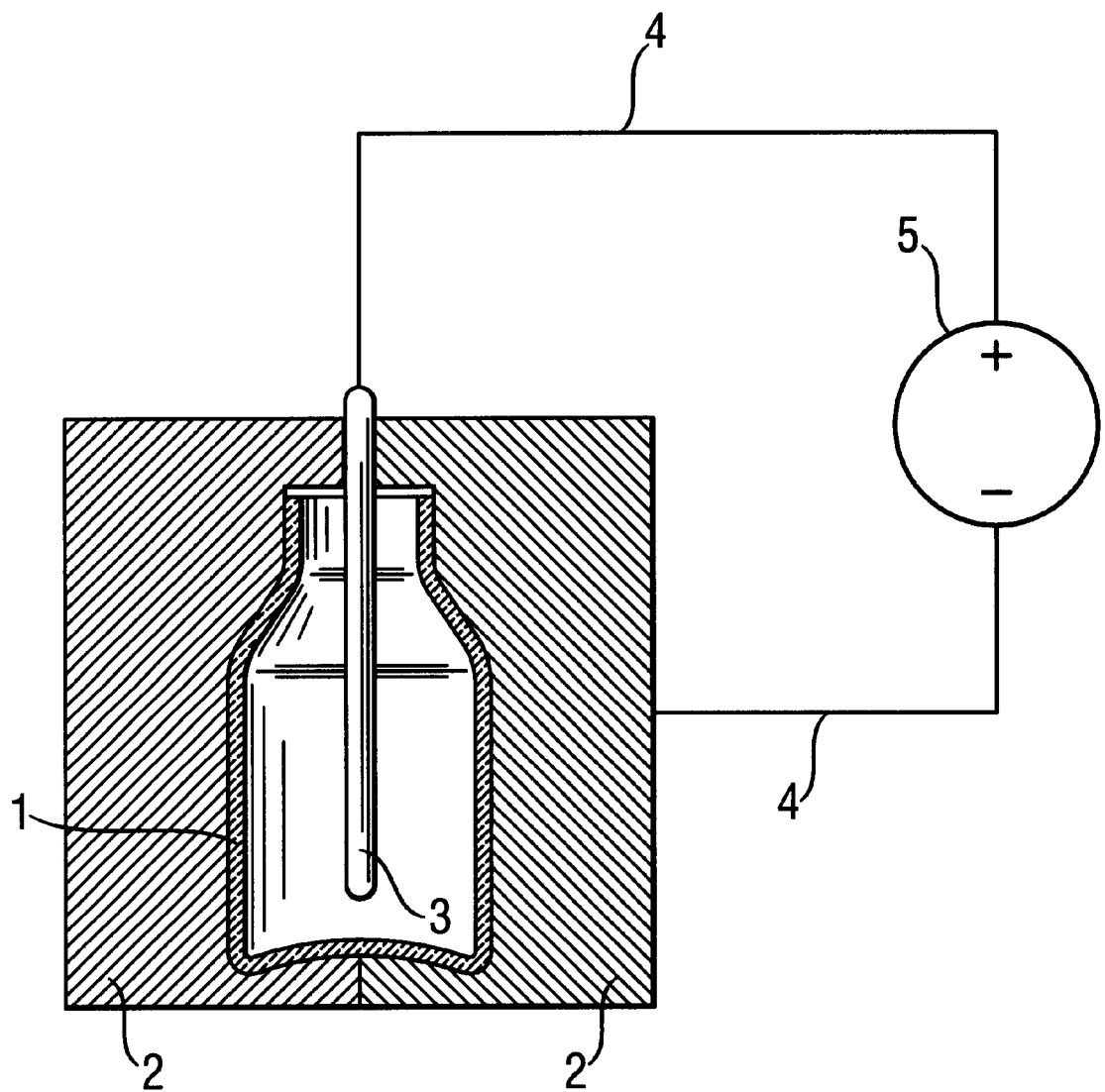
FIG. 3: Schematic description of molding of glass articles in metal molds.

According to FIG. 3 the present invention can be used in producing molded glass by connecting the conductive mold (2) to a current or voltage source (5) by means of a conductive wire (4). The second terminal of the source can be connected by an identical conductive wire as the previous one (4) to a sort of metal rod acting as an electrode (3), which slides inside the preform, but which avoids contact with the glass (1). When the article is released from the mold, the rod is withdrawn from the article without any difficulty, without leaving marks on the article.

Said internal contact can be brought about by means of any other system, some of said systems being able to be based on a direct contact inside the molded article between the electrode and the article, but so as not to produce marks inside the article.

By this invention, the hot sticking is reduced significantly and mostly eliminated for insulators containing a vitreous phase by performing the molding processes within an electric field. By this invention a high surface quality of the article to be molded, is obtainable. Processes using the method of the invention are less susceptible to breakdowns. The principle of the invention can easily be incorporated in existing devices for molding vitreous materials.

EXAMPLE 1
Frit and Enamel for Automobile Glass

The die coating used is a fabric of stainless steel very widely used in the field of the forming of automobile glass.

One type of typical frits used in enamels for automotive glazings may have a composition (% by weight) comprising:

| Oxide | wt. % |
| --- | --- |
| $Na_2O$ | 10–20% |
| $SiO_2$ | 30–40% |
| $TiO_2$ | 2–10% |
| $B_2O_3$ | 10–15% |
| ZnO | 17–25% |
| ZnS | 10–20% |

In this example the frit consisted essentially of (wt.-%): $Na_2O$ 16, $SiO_2$ 34, $TiO_2$ 5, $B_2O_3$ 11, ZnO 21 and ZnS 13. This frit has been screenprinted on a glass-sheet in a conventional manner. Stoving has been performed using a lab-equipment equivalent to that typically used in the art.

For an applied pressure of $35.5 \times 10^3$ Pa, and for a temperature of 670° C., a sticking force of $12.6 \times 10^3$ Pa has been measured without using the present invention. By applying a voltage of 9 V, which represents an electric field of 22.5 $V \times cm^{-1}$, for one and the same applied pressure and one and the same temperature, a sticking force of only $5.3 \times 10^3$ Pa has beer measured.

For the enamel prepared from said frit and a black pigment (weight ratio 70 to 30), under identical pressure and temperature conditions, a sticking force of $10.9 \times 10^3$ Pa has been measure when no voltage is applied. When a voltage of 9 V is applied, i.e. an electric field of 22.5 $V \times cm^{-1}$, the sticking force was zero. Similar effect could also be found by using frits/enamels with a different frit composition.

As is shown in FIG. 7 a variation of the sticking force is found, depending on the voltage applied.

The difference between sticking and non-sticking is clearly visible on the sheets which have undergone the tests. For the system which has not been polarized—see FIG. 6a—, it is noticed that a very high number of fibers of the die coating stick to the surface of the enamel. For the system, which has been polarised—see FIG. 6b—, the number of fibers of the die coating which have remained stuck to the enamel is practically zero. These are the fibers which were poorly inserted into the fabric, and which would become separated from the metal tissue irrespective of the test conditions and irrespective of whether the enamel composition was anti-stick or not. Slight marks are noticed on the surface of the enamel, showing that there has certainly been contact between the metallic die coating and the enamel. However, these marks are not very pronounced, and therefore do not affect the aesthetic properties of the enamelled layer. Moreover, they are completely invisible on the glass side.

The quality of the contacts between the conductive wires and the various elements plays an important role in the results which can be expected from this invention. The tests have been conducted on the frit whose composition has been given above and the results can be taken from the following table.

| | sticking force (Pa) | |
| --- | --- | --- |
| Voltage (V) | poor contacts | good contacts |
| 9 | $5.7 \cdot 10^3$ | $1.4 \cdot 10^3$ |
| 13.5 | $5.2 \cdot 10^3$ | $1.5 \cdot 10^2$ |

It is consequently recommended to take good care of the connections between the direct current source and the live electric elements of the system (in this example, these elements are the coatings of the forming die and the support of the glazing).

EXAMPLE 2

Effect of the temperature and the applied voltage on a frit for enamels intended for the bottling industry.

A typical frit for this application comprises:

| Oxide | wt. % |
| --- | --- |
| $Na_2O$ | 10–20% |
| $SiO_2$ | 10–20% |
| NaF | 5–10% |
| $B_2O_3$ | 25–45% |
| ZnO | 30–40% |

Figure 8:
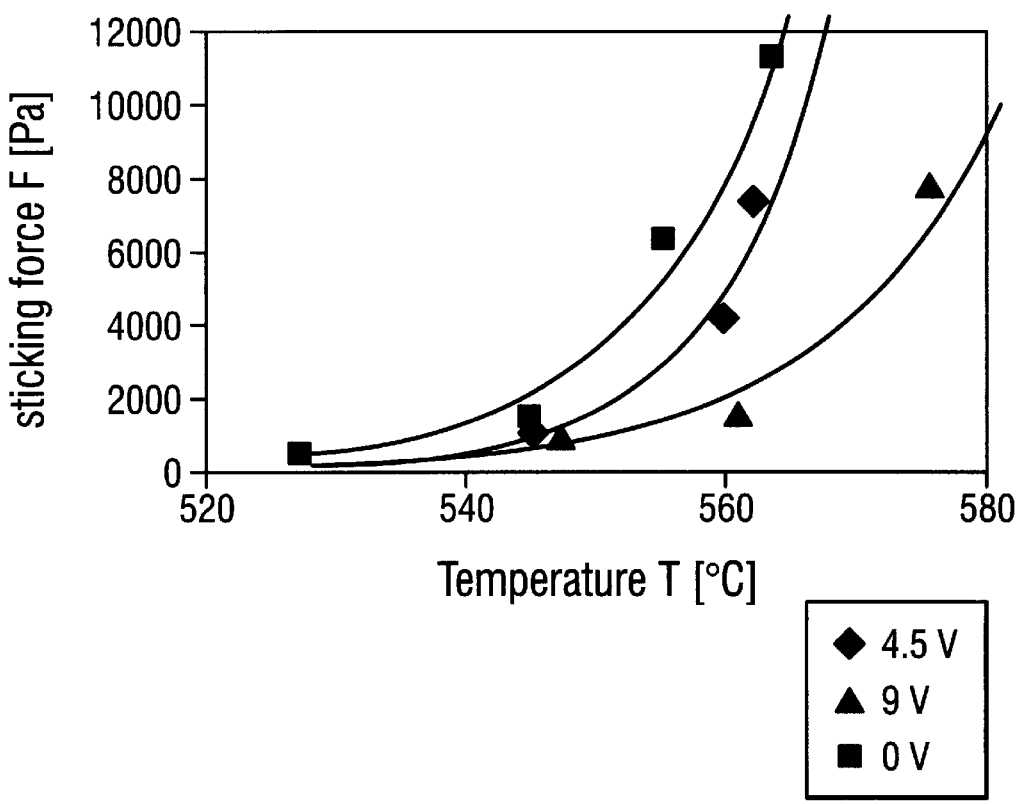
FIG. 8: Diagram showing the sticking force in dependence on the temperature at a voltage of 0 V, 4.5 V and 9 V.

The effect of the voltage varies with the temperature, as can be seen in the diagramm of FIG. 8. The frit tested consisted essentially of (wt.-%): $Na_2O$ 12, $SiO_2$ 12, $B_2O_3$ 39, ZnO 31 and NaF 6.

The effect of the applied voltage can be defined as the difference between the sticking force measured without voltage and the sticking force measured with voltage, divided by the sticking force measured without voltage.

As can be seen from FIG. 8, for this composition, the antisticking effect (=reduction of the sticking force) increases when the applied voltage is increased. For an applied voltage of 4.5 V, the antisticking effect of the applied voltage has a tendency to diminish when the operating temperature is increased. Conversely, for an applied voltage of 9 V, the effect of the applied voltage has a tendency to increase with temperature.

It is therefore important to be well acquainted with the insulator/forming die system in order to select the best voltage and temperature conditions, while at the same time respecting the constraints imposed by the forming process.

EXAMPLE 3
Glass for the Bottling Industry

In order to measure the sticking force, a glass used in the bottling industry was tested; said glass consisted of (wt.-%): $SiO_2$ 76, $Al_2O_3$ 4, CaO 1, $Na_2O$ 5, $K_2O$ 0.5, $B_2O_3$ 13.5. It was treated like a frit: it was crushed, then applied to a sheet of traditional window glass varying only slightly in composition from that of the glass for bottling.

At 740° C., a sticking force of at least $16.5 \times 10^3$ Pa has been measured when no voltage is applied. By applying a voltage of 9 V, under the same temperature and applied pressure conditions, the sticking force is no more than $1.5 \times 10^3$ Pa.

Numerous other compositions have been tested, for varying temperatures and applied voltages, with in every case, as a conclusion, a significant reduction in the sticking force and improved surface quality.

What is claimed is:

1. A method for reducing hot sticking between a die and an inorganic nonmetallic insulating material, which comprises:
   maintaining said die and said insulating material in a polarized state when said die and said insulating material are in contact with each other, wherein said insulating material has a glass frit or an enamel on the side of said insulating material which faces said die.

2. The method according to claim 1, wherein said die and said insulating material are contacted at a temperature where said insulating material is moldable.

3. The method according to claim 1, wherein a face of said die contacting said insulating material is positively charged and a face of said insulating material contacting said die is negatively charged at the time of contact.

4. The method according to claim 1, wherein at least a part of said insulating material contacting the die is in viscous form at the time of contact.

5. The method according to claim 4, wherein at least a part of said die contacting said viscous part of said insulating material is made from metal, metal-alloy or semi-conductor.

6. The method according to claim 1, wherein said die and said insulating material form an assembly, and wherein the polarized state is performed and maintained by applying a voltage or a current to said assembly, by the aid of a plate-like capacitor whose armaments are on either side of said assembly, or by inducing a current across the interface between the insulating material and die.

7. A process for producing a molded inorganic nonmetallic insulating material, which comprises:
   contacting an inorganic nonmetallic insulating material with a forming die at a molding temperature,
   molding the insulating material, and thereafter
   separating said molded insulating material and die from each other,
   wherein an assembly comprising said insulating material and said die is polarized during the contacting step, and wherein said insulating material has a glass frit or an enamel on the side of said insulating material which faces said die.

8. The process according to claim 7, wherein a face of the die facing the insulating material is positively charged and a face of the insulating material facing the die is negatively charged in order to polarize the assembly, and the polarization is maintained during said contact up to the moment of said separation.

9. The process according to claim 8, wherein at least a part of the insulating material contacting the die is in viscous form at the time of contact.

10. The process according to claim 9, wherein at least a part of the die contacting the viscous part of the insulating material is made from metal, metal-alloy or semi-conductor.

11. The process according to claim 7, wherein the polarized assembly further comprises a support for the insulating material which support is negatively charged during the contacting step, and wherein said die is positively charged during the contacting step and said insulating material is negatively charged during the contacting step.

12. The process according to claim 8, wherein said polarization and maintenance thereof are performed by (i) applying a voltage or current to said assembly or (ii) by positioning said assembly parallel in between the negative and positive pole of a plate-like capacitor which plates are connected with a current or voltage source or (iii) by inducing a current across the interface of the insulating material and die.

13. The process according to claim 11, wherein said insulating material is automotive glass, wherein at least a part of the automotive glass is provided with a stovable decorating layer, and wherein said die, said insulating material and said support are pressed together at a temperature sufficiently high for stoving said stovable decorating layer and bending the glass while maintaining said polarization.

14. The process according to claim 7, wherein said insulating material is blow-molded.

15. The method according to claim 1, wherein said insulating material is a glass sheet.

16. The method according to claim 7, wherein said insulating material is a glass sheet.

* * * * *